United States Patent [19]

du Pont et al.

[11] 4,137,052
[45] Jan. 30, 1979

[54] APPARATUS AND SYSTEM FOR PRODUCING COAL GAS

[76] Inventors: Anthony A. du Pont, 12 Outrider Rd., Rolling Hills, Calif. 90274; Joseph A. Connell, 24815 S. Normandie Ave., Harbor City, Calif. 90710

[21] Appl. No.: 825,271

[22] Filed: Aug. 17, 1977

Related U.S. Application Data

[63] Continuation-in-part of Ser. No. 765,881, Feb. 7, 1977, abandoned, which is a continuation of Ser. No. 682,257, May 3, 1976, abandoned.

[51] Int. Cl.$^2$ ............................................. C10B 3/02
[52] U.S. Cl. ............................................. 48/89; 48/99; 48/113; 48/120; 122/5; 165/141; 202/106; 202/126; 422/203; 422/204; 422/232; 122/5
[58] Field of Search ............... 48/89, 99, 101, 102 A, 48/105, 107, 113, 120, 67, 73, 77, 197 R, 202, 210; 23/277 R, 281 R; 110/31, 53; 165/140, 141; 202/106, 126, 115, 127; 432/210

[56] References Cited

U.S. PATENT DOCUMENTS

| | | | |
|---|---|---|---|
| 227,502 | 5/1880 | Douglass | 48/120 |
| 1,639,394 | 8/1927 | Wunsch | 48/113 |
| 1,967,582 | 7/1934 | Marischka | 48/76 |
| 2,093,493 | 9/1937 | Stitzer | 48/202 |
| 2,665,200 | 1/1954 | Kwauk | 48/210 |
| 3,433,713 | 3/1969 | Reid | 202/127 |
| 3,847,563 | 11/1974 | Archer et al. | 48/197 R |
| 3,854,896 | 12/1974 | Switzer et al. | 48/197 R |
| 3,909,299 | 9/1975 | Corrigan | 48/105 |

*Primary Examiner*—Richard V. Fisher
*Assistant Examiner*—George C. Yeung
*Attorney, Agent, or Firm*—Keith D. Beecher

[57] ABSTRACT

Apparatus and system for producing coal gas from coal, air and water. Pulverized coal is introduced into a rising stream of air and steam in a retort to constitute a fluidized or entrained bed. The coal reacts with the steam and air to form a gas consisting of hydrogen, carbon monoxide, carbon dioxide, nitrogen, methane and higher hydrocarbons. In some cases the air may be eliminated to produce nitrogen-free gas. In other instances, the production of methane and higher hydrocarbons may be suppressed to produce a gas consisting primarily of hydrogen and carbon monoxide. The retort is constructed so that product gas and air may be burned in an annular space surrounding the central reaction column to produce hot flue gas. Steam tubes may be disposed in the annular space so that the steam and air introduced to the central reaction chamber may be super-heated by the hot flue gas. A further annular space or "wet wall" may be provided surrounding the first annular space through which the intake water is passed, so that the intake water may be brought to a boiling point and converted to steam prior to its being introduced into the steam superheating tubes. This construction causes the walls to the retort to be maintained at a higher temperature than the reaction inside the column, so that all the heat radiated from the walls of the reaction column is directed inwardly, and no heat is lost through the walls. The product gas from the retort is then cooled and passed through a water spray which cools the gas to nearly room temperature, and removes all the fly ash and other particulate matter from the gas.

8 Claims, 1 Drawing Figure

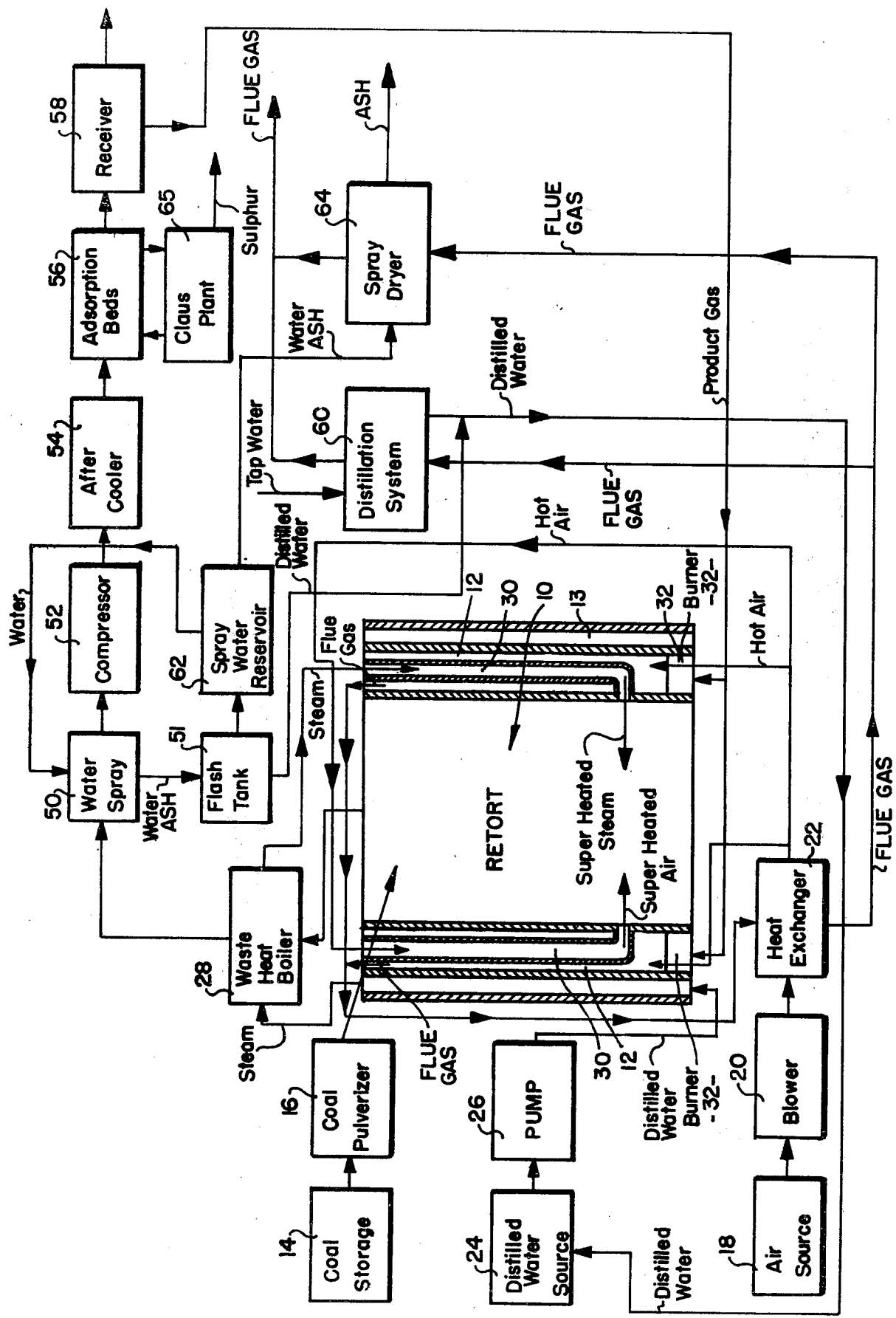

APPARATUS AND SYSTEM FOR PRODUCING COAL GAS

This application is a continuation-in-part of copending application Ser. No. 765,881, now abandoned, which was filed Feb. 7, 1977, and which is continuation of application Ser. No. 682,257 which was filed May 3, 1976, now abandoned.

BACKGROUND OF THE INVENTION

In the past, many utilities have been using high sulphur coal in their power plants for generating electricity. However, recent clean air legislation has required that sulphur dioxide emissions from power plants be reduced, and this requirement has forced many utilities to switch to natural gas or fuel oil, or to install facilities for stack gas scrubbing. Unfortunately, none of the alternatives has proven to be commercially feasible. Natural gas and fuel oil are more expensive than coal, and in many instances are difficult or impossible to obtain because of shortages. Moreover, stack gas scrubbing processes are still in the development stage.

A better approach to the solution of the problem is the use of coal gas. In the production of coal gas, the sulphur in the coal is converted to hydrogen sulphide which can be readily removed by known adsorption processes. In addition, the coal gas can be produced under pressure permitting operation economy in existing power plants and more efficient design in future power plants, as compared with the coal-burning facilities.

However, the prior art coal gas production systems require a plant with such a high capital cost that principal, interest, taxes and insurance alone mitigate any cost advantage over the use of coal in its original state. Moreover, when the additional costs of maintenance, operation and coal are added to the foregoing cost, the gas output of the prior art coal plants have a higher cost per BTU than any of the other competitive fuels. The system and apparatus of the present invention, on the other hand, has a dual advantage of low initial cost and lower maintenance. The system and apparatus of the invention is capable of producing a clean, medium BTU gas (300–500 BTU) which is much lower in cost than fuel oil and which is actually competitive with natural gas.

The apparatus of the invention includes one or more retorts, the number of retorts used being dictated by the gas requirements of any particular installation. The system permits the control of temperature and coal residence time which assists production of methane and higher hydrocarbons. Therefore, a medium BTU coal gas (300–500 BTU) can be produced in the apparatus of the invention without the prior art requirements of an air separation plant for oxygen production and without the prior art requirements for a high pressure system.

The retort used in the apparatus of the invention may be designed, as will be described, with a "wet" outer wall in which an annular chamber is provided around the reaction column. The annular chamber may contain steam tubes in which the steam introduced into the reaction column is super-heated by burning flue gas. By this construction, the walls of the reaction chamber in the retort are maintained at a higher temperature than the internal temperature of the column, so that any heat transfer through the walls is into the reaction column and not outwardly into the surrounding atmosphere.

The retort itself may be modified to accommodate a wide range of different types of coal, and to produce coal gases with varying BTU values to satisfy specific requirements.

The analysis of coal gasification processes is complicated by the multiplicity of possible products and the fact that many of the chemical species do not reach their equilibrium concentration during the process. These difficulties have been overcome for practical purposes by using a simplified analysis that relies on the conservation of the mass of each element and the conservation of energy. It has been found that the assumptions necessary to analyze a coal gas process using only an equation expressing conservation of mass and one expressing conservation of energy do not greatly affect the result. The relative amounts of CO and $CO_2$ produced do not significantly affect the lower heating value of the product gas, nor does the relative amounts of $CH_4$ and $C_2H_4$ and higher hydrocarbons. What is significant is the fraction of total hydrogen in the product gas that is converted to hydrocarbons, and the amount of heat added or removed from the gas during its production. The ratios of CO to $CO_2$ and $CH_4$ to $C_2H_4$ are therefore fixed as representative values and the equations solved with the fraction of hydrogen converted to hydrocarbons and the heat transferred through the reactor walls as parameters. Dependent variables solved for in the analysis are the air or oxygen necessary to complete the process and the water reacted with the coal. For simplification the coal is represented by carbon, hydrogen, oxygen and ash. If the coal contains other gases such as chlorine or nitrogen, they can be considered also.

The mass conservation equations state that the weight of each element entering the process is the same as each element leaving. These are incorporated into a single equation expressing the fact that the carbon in all the carbon containing gases equals the carbon in the coal. Energy conservation is expressed by stating that the heat of formation multiplied by the mass of each gaseous compound produced must equal the heat of formation of water multiplied by the amount of water consumed plus the heat of formation of coal, less any heat added to the process through the walls. Water is introduced into the reaction column of the retort in the system of the invention as super-heated steam, so that the heat of formation of water is that for the gaseous state. An advantage of the system and apparatus of the invention is that heat is actually added to the reaction column in the retort through the walls of the retort, as compared with the prior art systems in which heat is lost through the walls of the retort.

If enough heat is added through the walls of the retort in the apparatus of the invention so as to eliminate the requirement for air, thereby producing nitrogen-free gas, the BTU value of the gas is improved 100 BTU per cubic foot, or more. Conversely, loss of heat through the walls, as is the case with the prior art reactors, costs approximately 50 BTU per cubic foot of the gas produced. The reduced heating value of the gas produced by the prior art processes as compared with the gas produced by the apparatus and system of the invention is caused by the excessive air requirements of the prior art systems. As heat is lost through the walls of the prior art retort, more air is required; and as heat is transferred into the reaction column through the walls of the retort in the apparatus of the present invention, air requirements are reduced.

Heat will be transferred inwardly from the hot walls of the retort to the reaction column by radiation as long as the walls of the retort are above the reaction temperature in the reaction column. As described above, the apparatus of the present invention uses a retort in which flue gas is used to super-heat steam. This flue gas passes along the outer surface of the walls of the retort column, so that the walls of the retort are always maintained at a higher temperature than the reaction temperature within the column.

BRIEF DESCRIPTION OF THE DRAWING

The single FIGURE is a block diagram of one embodiment of the coal gas producing system and apparatus of the invention.

DETAILED DESCRIPTION OF THE ILLUSTRATED EMBODIMENT

The apparatus shown in the drawing includes a retort designated generally as 10. The retort 10 includes a central reaction column, and it also includes an annular chamber 12 surrounding the reaction column. Coal, or other carbon containing material, is obtained from a coal storage 14, and is pulverized by a coal pulverizer 16. The pulverized coal is introduced into the reaction column within retort 10.

Air from an appropriate air source 18 is blown by a blower 20 through a heat exchanger 22 into the annular chamber 12.

Distilled water from a source 24 is pumped by a pump 26 up through an annular chamber or "wet wall" 13 of the retort, in which the water is converted to steam. The steam is then introduced into a waste heat boiler 28 in which it is super-heated, and the super-heated steam is fed into a number of tubular members 30 which are positioned in the annular chamber 12 in which the steam is further super-heated. The lower end of the tubular members 30 are connected to the reaction column, so that the super-heated steam from the tubular member may be introduced into the lower end of the reaction column of retort 10.

Part of the air leaving the heat exchanger 22 is routed through the tubular members 30, and super-heated air from the tubular members 30 is blown upwardly in the reaction column to maintain the coal particles in an agitated condition so as to "fluidize the bed" or entrain the fine coal particles if an entrained bed is used as is necessary with caking coals. However, the combined air and steam flow is maintained at a sufficiently low velocity, that there is no tendency for the coal particles to be blown out of the top of the reaction column until they have reacted.

The waste heat boiler 28 is a heat transfer device that removes heat from the high temperature product gas leaving the retort, and uses the heat to super-heat the steam from the wet wall 13. It can also be used to boil additional water over and above that which can be processed by the wet wall or produce some or all of the required steam if the wet wall 13 is not used.

Appropriate burners 32 are provided at the lower end of annular chamber 12, and a portion of the product gas produced by the system is fed back to the burners and burned, causing a stream of hot flue gas to flow upwardly at a high velocity in the annular chamber, heating the walls of the annulus by convection, and heating the super-heated steam in tubular member 30. The heated outer wall radiates its heat to the inner wall which in turn radiates to the coal particles in the retort.

Insulation surrounding the outer wall of the annulus permits only a small fraction, on the order of a few percent of the heat to be lost to the surroundings. A wet wall 13 may be used to pick up this heat and use it to make steam. The heated flue gas from the annular chamber 12 is passed through the heat exchanger 22 to heat the incoming air prior to its being fed into the tubular members 30 leading to the lower end of the reaction column of retort 10, and into the lower end of annular chamber 12. It may also be used to superheat steam in a separate heat exchanger rather than in tubular members in the annulus.

The velocity of the heated flue gas through the annular chamber must be high enough to provide sufficient convective heat transfer to produce sufficient heat radiation into the central chamber. For example, the velocity of gas flowing through the central chamber may be of the order of 10–45 Ft/Sec; and the velocity of gas in the annular chamber may be of the order of 500 Ft./Sec.

The product gas from the reaction column of retort 10, after it has passed through the waste heat boiler 28, is fed to a water spray 50. The water spray 50 consists of a tank incorporating a number of water sprays through which the product gas passes after leaving the waste heat boiler. The water spray 50 serves to reduce the temperature of the product gas to approximately room temperature, and it also serves to condense the steam in the gas and also to remove fly ash and other particulate matter from the gas. The product gas from the water spray is then compressed in a gas compressor 52, and it is further cooled in an after-cooler 54.

The gas compressor 52 is a reciprocating or centrifugal unit depending on the size of the plant and magnitude of the gas flow. The compressor accepts low pressure product gas from the water spray 50 and compresses it to the required pressure level. The aftercooler 54 is used to lower the temperature of the product gas after leaving the gas compressor, as mentioned above. Cooling is provided by appropriate cooling water or ambient air.

The cooled product gas from compressor 52 is then passed through appropriate adsorption beds 56 to remore the hydrogen sulphide from the gas, and also to remove other undesirable constituents. The resulting purified product coal gas is passed to a receiver 58, where it is stored until needed. A portion of the product gas in receiver 58 is fed back to the burners 32 of the retort to created the hot flue gas in the annular chamber 12, as mentioned above.

The adsorption beds 56 are formed of molecular sieve tanks which, in turn, consist of vessels containing molecular sieve pellets. Molecular sieves are crystalline structures of aluminum silicates which are capable of selective entrapment of molecules according to size and polarity. Water and hydrogen sulphide molecules are trapped in the sieve pores and are thus removed from the product gas stream. The gas entering the adsorption beds 56 contains water and hydrogen sulphide, whereas the gas leaving the beds is dry and free of hydrogen sulphide.

When an individual Molecular Sieve Adsorption Bed 56 becomes saturated with water or hydrogen sulphide, the particular bed is shifted automatically to a "Desorption" mode of operation. During the desorption mode, water is removed by depressurization and heating, and hydrogen sulphide is removed by a small heated stream of inert gas. The gas from the bed containing the hydrogen sulphide is directed to a Claus Plant 65, where the major part of the hydrogen sulphide is converted to sulphur vapor and water. The sulphur vapor is cooled and removed as liquid sulphur. The gas effluent from the Claus Plant 65 is directed back through the Molecular Sieve Adsorption Bed 56 where the water and last traces of hydrogen sulphide are removed.

The water filter ash from water spray 50 is passed to a flash tank 51. The flash tank 51 may be a single stage flash evaporator. The exposure of the water and ash to low pressure in the flash tank causes a portion of the water to evaporate. The evaporated water is then condensed on appropriate cooling water condensing coils in the flash tank and recycled to the distilled water source 24 with water from a distillation system 60.

The water and ash from the flash tank 51 is passed to a spray water reservoir 62 in which the water is recovered for introduction to the water spray 50. The wet ash from reservoir 62 is dried in a spray drier 64 and subsequently removed. The distillation system 60 is formed, for example, of a multi-stage flash evaporator. The evaporator uses the heat in the flue gas after is has left heat exchanger 22 to distill, for example, 25% of the water required in the retort 10. The heat in the flue gas is also used in the spray drier 64 to dry the ash in the spray drier.

As described above, flash tank 51 receives return water from the water spray 50, as well as the ash and other particulate matter. The water that does not flash in the tank, along with the ash that has been recovered from the product gas, are piped from the tank to the spray water reservoir 62. The spray water reservoir acts as a holding tank for the water and as a settling tank for the ash. The required amount of make-up water is introduced into the spray water reservoir, and additional make-up water is supplied to the distillation system 60. The make-up water is necessary to replace the water lost to the reaction, to the product gas and to the water leaving the reservoir with the ash. Approximately equal amounts by weight of water and ash are piped from the reservoir to the spray drier 64.

The spray drier utilizes hot flue gas from the retort, as described above, to remove the water from the water-ash mixture coming from the spray water reservoir. The spray drier incorporates a filer on the gas discharge to assure that no fly ash is released to the atmosphere.

The various mechanisms represened by the blocks of the system of the invention are per se well known to the art, and it is believed that a complete understanding of the system and apparatus of the present invention may be obtained without the necessity for illustrating and describing the individual mechanizms in detail.

Coal, or other appropriate material, is crushed to approximately 10 mesh in the case of a fluidized bed or 200 mesh in the case of an entrained bed in the coal pulverizer 16 and is pneumatically delivered to the retort 10 where it is blown into a rising stream of steam and air to form a gas consisting of hydrogen, carbon monozide, carbon dioxide, nitrogen, methane and higher hydrocarbons. As stated above, in some cases it may be possible to eliminate the air steam into the retort 10 and cause the retort to produce nitrogen-free gas. As also stated, the production of methane and the higher hydrocarbons can be suppressed, so that the retort produces a gas consisting primarily of hydrogen and carbon monoxide.

As shown in the drawing, retort 10 is constructed so that product gas and air are burned in the annular chamber 12 surrounding the central retort column. The resulting hot flue gas super-heats the steam from waste heat boiler 28, pre-heats the air used in the retort by means of heat exchanger 22 and superheat tubular members 30, heats the incoming distilled water in the wet wall 13, and heats the retort wall so that heat may be added to the reaction zone by both convection and radiation heat transfer.

The gas produced by the retort 10 typically has a large amount of excess steam, and the hot gas and steam are routed through the waste heat boiler 28 to remove most of the heat from the product gas. The steam from the waste heat boiler is routed to the super-heater tubular member 30 in the annular chamber 12 surrounding the retort. The cooled gas and steam are routed through water spray 50 which cools the gas nearly to room temperature, condenses most of the excess steam and removes all the fly ash and other particulate matter, as stated above.

The product gas is then further cooled in after-cooler 54 and routed to the molecular sieve adsorption beds 56 which, as explained above, remove the remaining water and sulphur, which is present mostly as hydrogen sulphide. The clean gas from the adsorption beds 56 is either further compressed for use in pipelines or gas turbines, or is routed for use in boilers or chemical processing without further compression.

The water from water spray 50 is processed by filtration and distillation in the system of blocks 51 and 62, and the resulting water is re-used in water spray 50 and in the source 24.

The materials fed into the retort 10 are coal, air and steam, and the product produced by the system is completely clean burning fuel gas. Unlike the prior art systems, the system of the invention produces a satisfactory fuel gas at atmospheric pressure without the use of oxygen, thereby providing a significant reduction in plant costs. Significant improvements over earlier systems and apparatus are obtained by the construction of the retort which pre-heats the incoming air and steam, and which adds heat to the reaction column through the retort walls.

The system of the invention permits the use of space age metals in the retort to increase the heat input to the retort. Other significant improvements are present in the water spray and molecular sieve clean-up system which provides a completely dry and sulphur-free gas free from all particulate matter. The system itself, since it burns its own clean product gas, is pollution free.

The incoming water from water pump 26 is pumped up through the further annular chamber or "wet wall" 13 which surrounds annular chamber 12 in coaxial relationship therewith. The water flowing up through the annular chamber 13 is pre-heated by the hot flue gas in annular chamber 12, and boils steam which is fed through waste heat boiler 28 into the tubular member 30 to flow back down through the tubular member to emerge as super-heated steam into the bottom of the interior reaction column of retort 10.

A grate may be provided at the bottom of the reaction column, and a space below the grate may be provided for the accumulation of ashes. However, the retort may be operated so that almost all ash passes out through the top of the retort to be separated from the gas in water spray 50, so that there would be no large accumulation of ashes in the space below the grate. A water tray may also be provided at the very bottom of the retort.

In order to transfer the required amount of heat to the walls of the retort, the flue gas must pass through the annular chamber 12 and along the wall of the retort at relatively high velocity. The structure of the present invention differs from the prior art structures, in that the annular chamber 12 has a relatively small width in relation to the diameter of the retort, in order to transfer large amounts of heat into the reaction zone within the retort.

The development of space age materials, and specifically high temperature nickel alloys, has made is possible to operate the apparatus of the invention at temperatures high enough to radiate the required amount of heat into the entrained or fluidized bed contained in the retort.

The gas velocity within the retort necessary to fluidize or entrain the bed is relatively high, and should be in a range of from ten feet per second to forty-five feet per second. This rate of gas production places a requirement for high heat transfer through the walls of the retort from the annular chamber 12, this heat transfer being of the order of 4 BTU per square foot per second.

The heat which is radiated into the reaction zone from the annular chamber 12 must first be transferred from the hot flue gas to the annular walls by convection. The outer and inner walls, being close to the same temperature, will have about the same convection heat transfer rate. The outer wall is insulated and will operate at a temperature of the order of 100° Fahrenheit higher than the inner wall. The outer wall is thus able to transfer its heat by radiation to the inner wall which, in turn, radiates heat into the reaction chamber. The coal particles in the reaction chamber will absorb the heat since they are at a temperature about 200° Fahrenheit lower than the wall temperature.

The radiation heat transfer into the reaction chamber is governed by the Stefan Boltzman law:

$$q = EKT^4$$

where:
q is the heat radiated by the surface per unit area per unit time;
E is the emissivity ratio, or the ratio of radiation from the surface to radiation from an ideal black body at the same temperature;
K is the Stefan Boltzman constant; and
T is the absolute temperature of the surface.

To transfer enough heat by radiation to heat an entrained or fluidized bed of coal to gasification reaction temperature, the wall temperature must be relatively high, above 1600° Fahrenheit, a temperature in excess to the limits of earlier materials available for retort construction.

Convection heat transfer is calculated from an equation relating heat transfer to the fluid density, velocity, viscosity and temperature as follows:

$$q = h \frac{W}{gA} (H_r - H_w)$$

where:
q is the heat transfer rate in terms of heat per unit area per unit time;
h is a heat transfer coefficient;
W is the weight of gas flowing through the annular chamber per unit time;
g is the acceleration of gravity;
A is the area of the cross-section of the annular chamber at the point where the heat transfer is being computed;
$H_r$ is the recovery enthalpy of the gas; and
$H_w$ is the enthalpy of the gas at the wall temperature.

The heat transfer coefficient h is equal to one-half the skin friction coefficient divided by the Prandtl number to the two-third power, by Reynolds analogy which postulates that energy and momentum are transferred by the same mechanism. The skin friction coefficient in the annular chamber can be very closely approximated by the formula:

$$f = \frac{.046}{R^{.2}} \text{ power}$$

where:
f is the skin friction coefficient; and
R is the Reynolds number.

The Reynolds number is the ratio of inertial forces to viscous forces in a flowing fluid:

$$R = \frac{WD}{Ag\mu}$$

where:
D is the width of the annular chamber;
$\mu$ is the viscosity of the fluid.

The equation for computing heat transfer is then:

$$q = \frac{0.23 \frac{W}{Ag} (H_r - H_w)}{P^{2/3} \left( \frac{WD}{Ag\mu} \right)^{.2}}$$

where:
P is the Prandtl number.

The aforesaid equation has been used successfully to predict heat transfer in annular ram jet ducts operating at very high gas temperatures and relatively cool wall temperatures, such conditions being similar to the conditions in the annular chamber 12 of the apparatus shown and described herein.

It can be seen by examining the aforesaid equation that a high heat transfer is obtained at a high flow per unit area of the flue gas, and that the annular chamber ideally should reduce in cross-section area as heat is transferred out of the flue gas, and as the difference between the recovery enthalphy and the wall enthalpy becomes less. Maximum heat transfer would occur if the flue gas in annular chamber 12 were flowing at sonic velocity where the flow per unit area is always maximum. The pressure drop can then be very high even if there were a good diffuser at the end of the annular chamber. In order to keep the pressure drop in the annular chamber low, Mach numbers less than the order of 2/10 must be maintained.

To obtain reasonably uniform heating along the wall of the retort, the velocity of the flue gas must be increased by reducing the cross-section area of the annular chamber as heat is removed from the flue gas, and the maximum Mach number will occur at the smallest cross-sectional area, that is, at the upper end of the annular chamber.

It will be appreciated that although a particular embodiment of the apparatus of the invention has been shown and described, modifications may be made. It is intended in the following claims to cover the modifications which come within the spirit and scope of the invention.

What is claimed is:

1. Apparatus for producing coal gas comprising: a retort having a central reaction column surrounded by a wall and having an outlet for hot coal gas produced by the reaction column; means for introducing pulverized coal, or the like, into the reaction column; wall means forming an annular chamber surrounding said first-named column in coaxial relationship therewith; burner means coupled to said annular chamber; means for introducing combustible gas and air into the annular chamber to be burned by said burner means so as to produce hot flue gas passing through the annular chamber for maintaining the wall of the reaction column at a temperature higher than the interior temperature of the reaction column so that heat is directed inwardly through the wall into the interior of the reaction column; further wall means forming a second annular chamber surrounding the firstnamed annular chamber; and means for introducing water into said second annular chamber to be heated by heat from said first-named annular chamber.

2. The apparatus defined in claim 1, and which includes means for introducing the water from said second annular chamber as steam into said reaction column to react with the pulverized coal.

3. The apparatus defined in claim 1, and which includes tubular members positioned in the first-named annular chamber for carrying steam for introduction into the reaction column, said steam being super-heated in the tubular members by the hot flue gas in the first-named annular chamber.

4. The apparatus defined in claim 1, and which includes waste heat boiler means coupled to said outlet of said retort to receive the hot coal gas from the retort; means for introducing water into said waste heat boiler means for conversion into steam therein; and means for introducing the resulting steam into said reaction column.

5. The apparatus defined in claim 4, and which includes water spray means coupled to the outlet of the waste heat boiler for cooling the hot gas introduced in the reaction column so as to condense excess steam therein and so as to remove fly ash and other particular matter therefrom.

6. The apparatus defined in claim 5, and which includes adsorption means coupled to said water spray means for adsorbing hydrogen sulphide and other constituents out of the gas from the spray means.

7. The apparatus defined in claim 6, and which includes further means coupled to said adsorption means for converting the hydrogen sulphide therefrom during a desorption mode into sulphur vapor and water, and for directing the gas effluent from the further means back through said adsorption means to remove the last traces of hydrogen sulphide and water.

8. The apparatus defined in claim 1, and which includes means for introducing air into the lower end of the central reaction chamber.

* * * * *